United States Patent [19]

Lurz

[11] Patent Number: 4,516,747
[45] Date of Patent: May 14, 1985

[54] METHOD OF AND APPARATUS FOR CONTROLLING THE BOUNDARY LAYER FLOW OVER THE SURFACE OF A BODY

[75] Inventor: Werner Lurz, Hamburg, Fed. Rep. of Germany

[73] Assignee: Messerschmitt-Bölkow-Blohm GmbH, Munich, Fed. Rep. of Germany

[21] Appl. No.: 519,689

[22] Filed: Aug. 2, 1983

[30] Foreign Application Priority Data

Aug. 3, 1982 [DE] Fed. Rep. of Germany ....... 3228939

[51] Int. Cl.³ ............................................. B64C 23/00
[52] U.S. Cl. ..................................... 244/204; 244/130
[58] Field of Search ....................... 244/130, 204, 205; 114/67 R

[56] References Cited

U.S. PATENT DOCUMENTS 3,362,663 1/1968 Wehrmann .......................... 244/130

FOREIGN PATENT DOCUMENTS 1923633 12/1970 Fed. Rep. of Germany .
1956760 7/1973 Fed. Rep. of Germany ...... 244/205

Primary Examiner—Galen L. Barefoot
Attorney, Agent, or Firm—Toren, McGeady, Stanger

[57] ABSTRACT

In controlling the boundary layer of flow over the surface of a body, for reducing resistance and impeding flow separation, a sensor element in the surface measures certain flow values in the boundary layer. The measured values are conveyed to an analyzer control circuit which, in turn, conveys a signal to an active vibration transmitter in the surface of the body for providing the required control.

5 Claims, 3 Drawing Figures

METHOD OF AND APPARATUS FOR CONTROLLING THE BOUNDARY LAYER FLOW OVER THE SURFACE OF A BODY

SUMMARY OF THE INVENTION

The present invention is directed to a method of and an apparatus for influencing or controlling flow in the boundary layer passing over the surface of a body in accordance with the principle of the active change in the original motion of the flow particles in the boundary layer passing over the surface of the body.

It is known that many animals such as fish and birds, often move at astounding high Reynolds' numbers, an achievement which can only be explained with reference to the positive influence of the surface of the body in the path of flow. With this knowledge as a basis, attempts have been made in the past to construct underwater bodies with a flexible outer skin similar to the skin of dolphins, or, as disclosed in the German Offenlegungsschrift No. 19 23 633, to provide a wing with a fur-like lining corresponding to a bird's wing. During the 1950's consideration was given to such "passive resistance reducers" which indicate that a flexible outer skin can act to reduce resistance in two ways:

1. The instability vibrations or oscillations of the flow particles in the *laminar* boundary layer can be dampened by means of the elasticity of the outer skin and, accordingly, the transition can be delayed (resistance reduction up to 56%); and
2. The wall friction in *turbulent* boundary layers can be considerably reduced by the elasticity of the outer skin, however, to this day there is still no accurate physical explanation for this phenomenon (resistance reduction up to 70%).

Commencing with the above-mentioned type of "passive" vibration control in the boundary layer, it is the primary object of the present invention to improve the positive effects of a body surface, which is not neutral with respect to vibrations, on the friction resistance by utilizing an "active" control of the flow vibration within the flow boundary layer on the body. In such control, depending on the conditions, flow separation can be impeded, since as is known the laminar flow can be made turbulent, that is, more resistant to separation, by a suitable vibration stimulation, and energy can also be supplied to the turbulent boundary layer in this manner.

In accordance with the present invention, certain flow values are sensed at the surface of the body over which the flow takes place and the sensed values are transmitted to an analyzer control circuit from which a signal is transmitted to vibration transmitters in the surface of the body for achieving the desired flow control.

The basic concept of the invention will now be discussed.

The energy balance within a two-dimensional boundary layer flow resembles the following as an average for a given time period:

$$\frac{d}{dx} \int_0^\infty \frac{\overline{u'^2} + \overline{v'^2}}{2} U(y)\, dy = \int_0^\infty -\overline{u'v'} \frac{dU}{dy}\, dy - \nu \int_0^\infty \overline{\omega'^2}\, dy - 1/\rho \frac{d}{dx} \int_0^\infty \overline{p'u'}\, dy - \nu \frac{d}{dx} \int_0^\infty \overline{v'\omega'}\, dy \quad (1)$$

The crossbars designate, in each case, the time average, and the vertical strokes designate the fluctuation values. Moreover, small $u'$ = fluctuation of the particle velocity in the x-direction; $v'$ = fluctuation of the particle velocity in the y-direction; $U(y)$ = local main velocity of the particles in the x-direction; $p'$ = fluctuation of the pressure; x, y = Cartesian coordinates, $\rho$ = density of the flow medium; $\nu$ = kinematic viscosity of the flow medium; $\omega'$ = fluctuation of the vortex strength of the particles.

The essential reaction during the instability process is the energy production by means of the Reynolds stress as compensation for the viscous dissipation, in equation (1) it is represented by means of the first term on the right side. This term can be expressed for periodic vibrations as:

$$E_{Re} = -\int_0^\infty U_A \cdot V_A \cdot \cos(\theta_{u'} - \theta_{v'}) \frac{d(u/U_o)}{dy}\, dy \quad (2)$$

with $E_{Re}$ = energy production by means of the Re-stress; $U_A$, $V_A$ = values of the maximum amplitude of $u'$, $v'$; $\theta_{u'}$ = phase angle of the $u'$-fluctuation; $\theta_{v'}$ = phase angle of the $v'$-fluctuation.

Furthermore:

$$u' = e^{-a_i \cdot x} \cdot U_A \cdot \cos(a_T \cdot x - \beta \cdot t - \theta_{u'}) \quad (3)$$
$$v' = e^{-a_i \cdot x} \cdot V_A \cdot \cos(a_T \cdot x - \beta \cdot t - \theta_{v'})$$

with $a = a_r + a_i$ = the complex wave number; $\beta$ = reduced frequency; and $t$ = time.

Theoretical investigations show that in dampened instability frequencies the energy production term $$(-\overline{u'v'}\, dU/dy)$$

in equation (1) must be partly or entirely negative along the boundary layer, whereby on the other side it is shown that a negative energy production along the boundary layer is capable of dampening the instability vibrations in an effective manner. The same applies to the following pressure energy term, which is, however, substantially slighter $$E_{p'} = 2a_i \int_0^\infty P_A U_A \cos(\theta_{p'} - \theta_{u'})\, dy \quad (4)$$

where $E_{p'}$ = energy production by means of pressure fluctuation or transient pressure; $P_A$ = maximum value of the pressure amplitude; and $\theta_{p'}$ = phase angle of the pressure fluctuation.

In both cases it can be noted immediately that the sign of the energy production is dependent in a simple manner on the phase angle difference, $(\theta_{u'} - \theta_{v'})$ or $(\theta_{u'} - \theta_{p'})$, respectively, in such a way that an angle difference $< \pi/2$ always produces a negative energy production along the entire boundary layer thickness.

For the case in which the instability vibrations are to be dampened, it is provided, on the basis of the invention, that utilizing a corresponding vibration exciter or transmitter in the body surface, either a tangential particle vibration is excited at the wall in such a way that $\theta_{u'} < (\pi/2) + \theta_{v'}$ and $\theta_{u'} < (\pi/2) + \theta_{p'}$, respectively, a vertical particle vibration is excited so that: $\theta_{v'} > \theta_{u'} - (\pi/2)$, or a pressure oscillation or vibration is excited so that the $\theta_{p'} > \theta_{u'} - (\pi/2)$. For the case of the artificial strengthening of the instability vibrations until the transition, the above-mentioned applies with the opposite sign.

For the purpose of control of particles in proximity to the surface in the *turbulent* boundary layer, an advantageous effect on the wall shearing strain, as well as on the separating behavior is shown. Furthermore, it is disclosed, in flexible surfaces, that the degree of turbulence in the boundary layer can be substantially reduced, so that the total energy transfer is reduced. In the case of a turbulent boundary layer, it is provided, in accordance with the present invention, that a horizontal or vertical particle vibration or oscillation is introduced in the turbulent boundary layer whereby the degree of turbulence and, accordingly, the wall friction, is reduced, or, in the case of the avoidance of separation, the degree of turbulence and similarly the energy transfer is increased.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
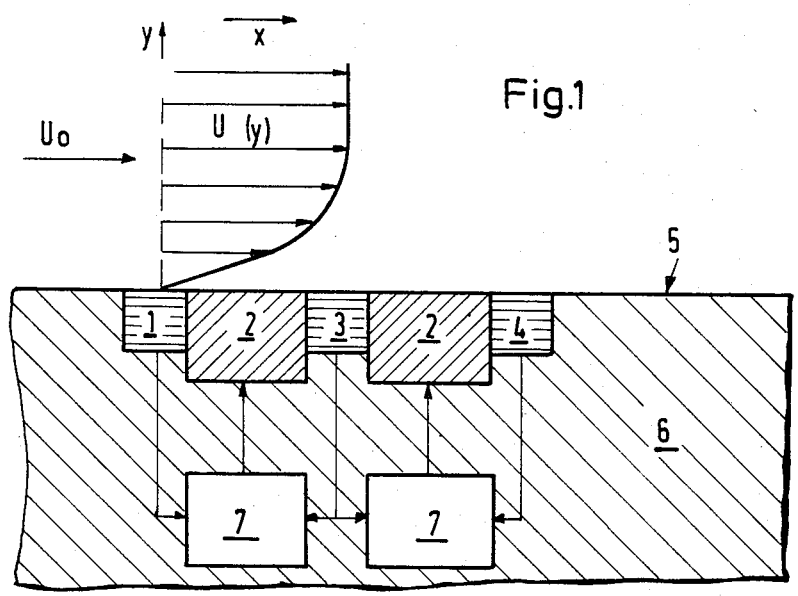
FIG. 1 is a schematic view illustrating a combination of sensors and vibration transmitters arranged in the flow direction and connected to analyzer control circuits.

In FIG. 1 a schematic arrangement of sensors 1, 3 and 4 and vibration transmitters 2 are shown in the surface 5 of a structural component part or body 6 over which the flow passes. $U_o$ represents the local velocity of flow, $U(y)$ designates the local velocity in the boundary layer, and x and y designate the Cartesian coordinates. The measurements recorded by the sensors 1, 3, 4 are each continuously fed into one of the analyzer control circuits 7 with a corresponding periodic control signal being sent out from the analyzer control circuit to one of the vibration transmitters 2. For controlling the instability vibrations in the laminar flow of the boundary layer, the frequency spectrum, the amplitudes and the phase position of the fluctuation velocities are measured by means of the sensors. Hot wires or film probes, piezo crystals and the like can be used as the sensors 1, 3 and 4. To control the wall friction in the turbulent boundary layer, it is advantageous to measure the wall friction or the degree of turbulence. In the analyzer control circuit 7, the signal of the input data from the sensors, which signal is predominant for the laminar boundary layer, is analyzed with respect to frequency, amplitude and phase position and, taking as a basis the signal difference in front of and behind the vibration transmitter 2, a periodic signal is produced with respect to frequency, amplitude and phase and is conveyed to the vibration transmitter 2 located in the boundary layer so that the amplitude of the predominant instability vibration measured by the sensor 3 behind the first vibration transmitter 2 is smaller (in the case of dampening) or larger (in the case of stimulation) than the amplitude which was measured in the sensor 1 in front of the first vibration transmitter 2. Mechanical diaphragms or membranes, hot wires or films, electromagnetic field producers, or electrically conducting thin-walled surface areas which are insulated from the body, and the like, may be utilized as vibration transmitters. According to tests which have been performed, the optimum size of the active surface portion is approximately four times the wave length of the predominant vibration.

In the case of the turbulent boundary layer, it must be determined which is more advantageous, a frequency analysis of the wall shearing stress signals or degree of turbulence signals with subsequent dampening or strengthening of the predominant frequencies by the corresponding application of a periodic signal to the vibration transmitter, or a simple controlling by a wide band spectrum signal.

The use of two vibration transmitters 2, one behind the other in the flow direction, as shown in FIG. 1, improves the effect of boundary layer control and in accordance with the present invention, several such sensor-vibration transmitting systems can be arranged one behind the other. The sensor 3 located behind or downstream of the first vibration transmitter 2 also acts, at the same time, as a sensor in front of or upstream of the second vibration transmitter 2 and it supplies its data to both the first analyzer control circuit 7 as well as to the second analyzer control circuit 7. The last sensor 4 is located behind or downstream of the second vibration transmitter. While a sensor is shown in front of and behind each vibration transmitter 2, it is also possible to provide a sensor in front of or behind each vibration transmitter 2.

Figure 2:
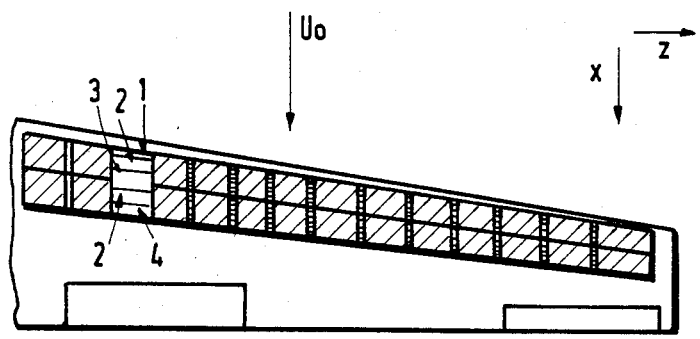
FIG. 2 is a schematic view of an arrangement of a sensor-vibration transmitter system disposed perpendicular to the flow direction.

FIG. 2 illustrates one embodiment of the sensor-vibration transmitter system arranged perpendicular to the flow direction in combination with an airfoil. In this figure z designates the third Cartesian coordinate. To counter an undulating or hill-valley expansion of the instability vibrations in the z-direction in an optimum manner, a number of sensor-vibration transmitter systems can be place next to one another in the z-direction.

Figure 3:
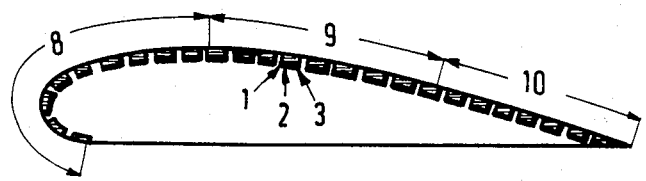
FIG. 3 is a schematic showing of a sensor-vibration transmitter system in the surface of an airfoil profile.

In FIG. 3 an arrangement is shown of multiple sensor-vibration transmitter systems of various functions in an airfoil profile. In the region of the laminar boundary layer 8, the sensor-vibration transmitter systems 1, 2, 3 are arranged so that instability vibrations are dampened and transition is delayed. In the region of the turbulent boundary layer 9, the sensor-vibration transmitter systems are arranged so that the degree of turbulence and thus the wind shearing stress, is minimized. In the region of the turbulent boundary layer 10 where there is a danger of separation, the sensor-vibration transmitter systems are arranged so that the degree of turbulence and, accordingly, the energy supply from the free flow, are increased.

While specific embodiments of the invention have been shown and described in detail to illustrate the application of the inventive principles, it will be understood that the invention may be embodied otherwise without departing from such principles.

I claim:

1. Method for controlling the flow in the boundary layer at the surface of a body cover which flow takes place, based on the active change of the original motion of flow particles in close proximity to the surface, comprising the steps of continuously measuring at least at two locations at least two of the physical values of the flow, as the frequency spectrum, the amplitudes and/or the phase position of the fluctuation velocities, directing the measured values to a control circuit, analyzing the measured values in the control circuit and determining the predominant frequency, and, based on the predominant frequency, transmitting a corresponding vibration signal to an active vibration transmitter located on the surface over which the flow takes place, and locating the measuring locations one adjacent to and upstream from the active vibration transmitter and the other adjacent to and downstream from the active vibration transmitter.

2. Apparatus for controlling flow in the boundary layer of the surface of a body over which flow takes place, based on the active change of the original motion of the flow particles in close proximity to the surface, comprising at least two passive sensor elements located in the surface of the body spaced apart in the direction of flow over the surface of the body, at least one active vibration transmitter located in the surface of the body between said at least two sensor elements, an analyzer control circuit connected to said at least two sensor elements and to said vibration transmitter so that the measurement effected by said sensor elements is transferred to said circuit where it is analyzed and based on the predominant frequency measure by said sensors a correcting signal is transmitted to said vibration transmitter for controlling the flow conditions within the boundary layer flow over the surface of the body.

3. Apparatus, as set forth in claim 2, wherein said sensors comprise at least one of a mechanical pressure receiver, a piezo crystal, an inductive receiver, a hot film, and the like.

4. Apparatus, as set forth in claim 2, wherein said vibration transmitter comprises at least one of a vertically oscillating surface part, an electromagnetic field, an electrically conducting surface area, piezo crystal, a hot film and the like.

5. Apparatus for controlling flow in the boundary layer of the surface of a body over which flow takes place, based on the active change of the original motion of the flow particles in close proximity to the surface, comprising at least two passive sensor elements located in the surface of the body, at least one active vibration transmitter located in the surface of the body, an analyzer control circuit connected to said sensor elements and to said vibration transmitter so that the measurement effected by said sensor elements is transferred to said circuit where it is analyzed and a correcting signal is transmitted to said vibration transmitter for controlling the flow conditions within the boundary layer flow over the surface of the body, and a plurality of said sensors and a plurality of said vibration transmitters are combined as a unit ready to be installed with said sensors and vibration transmitters alternating one after the other in the direction of flow over the surface of the body.

* * * * *